Nov. 25, 1958 R. B. WALLACE ET AL 2,862,064

HEAD MOUNT

Filed March 4, 1953 2 Sheets-Sheet 1

INVENTORS:
Russell B. Wallace
Melnor C. Rudser

By Mason, Mason & Sheridan
Patent Attorneys

INVENTORS:
Russell B. Wallace
Melnor C. Rudser

By Mason, Mason & Sheridan
Patent Attorneys

United States Patent Office 2,862,064

Patented Nov. 25, 1958

2,862,064

HEAD MOUNT

Russell B. Wallace, Manhattan Beach, and Melnor C. Rudser, Woodland Hills, Calif., assignors, by mesne assignments, to The National Cash Register Company, a corporation of Maryland Application March 4, 1953, Serial No. 340,368

12 Claims. (Cl. 179—100.2)

This invention relates to an adjustable mount assembly for magnetic transducers and particularly such a mount assembly as is useful in conjunction with magnetic storage devices.

In digital computers, for example, a rotating magnetic drum may be arranged to cooperate with a serially operated electronic arithmetic unit such that information generated by the arithmetic unit is deposited by way of a record transducer or magnetic head onto the moving surface of the magnetic drum. A fixed period later this surface passes under a read transducer which routes the information back into the arithmetic unit where it may be operated upon and again deposited by way of the record transducer onto the drum. This arrangement provides a highly flexible feedback loop or recirculating line in which data can be stored and rendered serially accessible for repetitious type of operations in the arithmetic unit.

In the utilization of such recirculating lines, it is necessary to space the read transducer from the record transducer so as to precisely define the delay period of the line in accordance with the timing signals generated by a clock recording previously deposited on a separate track of the drum. Prior to assembly, the drum barrel which holds the heads is machined so as to relatively locate the heads within a few thousandths of an inch of their desired positions but this is not accurate enough to come within the time basis as determined by the clock recording. Hence, when setting up the equipment, it is necessary to adjust the position of the transducers while the drum is rotating so as to bring into coincidence on an oscilloscope, for example, the waveforms of a reference signal picked up by the read transducer with a specified signal from the timing track.

In more highly complex digital computers of this type, a plurality of such recirculating lines for data are provided. Because of the density with which bits of information may be stored on the surface of the drum, the transducer units are positioned relatively near to each other in the stationary drum barrel in which they are held. As a result of this arrangement, and the further fact that the transducers are confined within the drum barrel, they are made relatively inaccessible and a fine manual circumferential adjustment of them while in their mountings is made difficult.

One of the objects of this invention is the provision of a head mount assembly which makes possible precise adjustments of magnetic heads or transducers about the moving surface of a storage medium.

Another object of this invention is the provision of a head mount assembly for a data storage drum wherein the radial gap between the magnetic head and the surface of the drum may be precisely maintained while the head is adjusted circumferentially.

A further object of the invention relates to the provision of a rigid magnetic head mount assembly which enables the head to be circumferentially adjusted about the surface of a storage drum by rotating an easily accessible screw having a radial travel.

Still another object is the provision of an adjustable head mount assembly having a minimum number of parts, simpleness of construction, and rigidity of structure so as to be well adapted to effect and maintain precise settings of the heads.

These and other objects of the invention relating particularly to details of construction and operation will become apparent from the following description read in conjunction with the accompanying drawings, in which.

Figures 1, 2, 3, 6, 7:
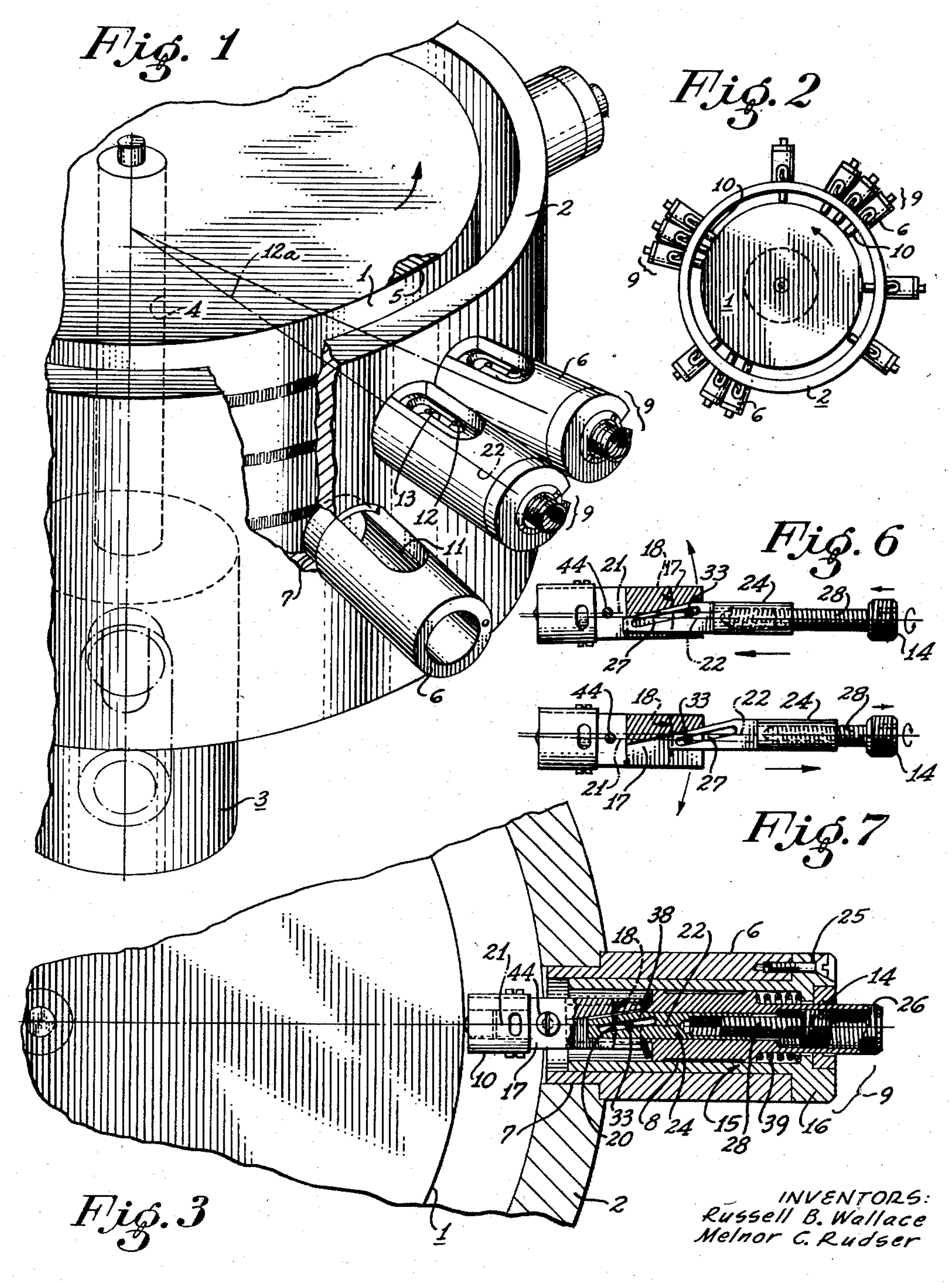
Fig. 1 is a perspective view of a portion of a data storage system showing how the head mount assemblies are held in the barrel surrounding the storage drum.
Fig. 2 is a plan view of a data storage drum showing how the head mount assemblies are clustered around the periphery thereof.
Fig. 3 is a longitudinal cross-sectional view of a head mount assembly in an installed position relative to the drum.
Fig. 6 is a schematic drawing showing the position assumed by the magnetic head in the mount assembly when the radial adjusting screw is rotated to its full travel counterclockwise.
Fig. 7 is a schematic drawing showing the position assumed by the magnetic head in the mount assembly when the radial adjusting screw is rotated to its full travel clockwise.

Referring to Fig. 1, a perspective illustration is shown of a memory unit for a digital computer which utilizes the preferred embodiment of the present invention. A drum 1, whose periphery is composed of a non-magnetic material, is concentrically mounted to rotate within a stationary drum barrel 2 at substantially a constant speed by means of a motor 3 which drives a drum shaft 4. The surface of drum 1 has a coating 5 of ferric oxide which provides the medium for magnetically storing bits of information, as required in digital computer storage systems, for example.

A plurality of sleeves 6 are press-fitted into holes 7 drilled through the wall of the barrel 2. When so positioned in the wall of the barrel, the longitudinal axis 22 of the sleeve 6 is substantially aligned with a radius **12*a* of the drum 1. Each of the sleeves 6 is used for receiving and holding a head mount assembly 9 having a magnetic head 10 (see Fig. 2) extending beyond the inside opening of the sleeve 6 into the space provided between the inner wall of drum barrel 2 and the surface of the drum 1. The sleeves 6 are milled out along their top surface, as assembled, in order to form an oval slot 11 which allows access to set screws 12 and 13 used for locking the magnetic head 10 in position in the head mount assembly 9**, after being properly radially and circumferentially adjusted.

As indicated in Fig. 1 and Fig. 2, the sleeves 6 are positioned about the surface of drum 1 in the barrel 2 relatively near to each other such as to render the space at the sides of the sleeve 6 inaccessible for the provision of any lateral adjustments of the magnetic heads circumferentially about the drum, once the head mount assembly 9 has been positioned in the sleeve 6. Therefore, as noted particularly in Fig. 3, the present head mount assembly 9 provides for obtaining a precise circumferential adjustment of the magnetic head 10 about the surface of the drum 1 by simply rotating a radially traveling screw 28, whose threaded socket head 14 is accessible from the outer end of the head mount assembly 9, by means of a hexagon head wrench, for example.

Fig. 3 shows a sectional view of the head mount assembly 9 in position in the drum barrel 2. A cylindrical housing 15 has a sliding fit in the sleeve 6 and is inserted therein such that a flange 16 on its outer end abuts the end of the sleeve 6. Once in position, the housing 15 is prevented from moving by locking screw 25. Concentrically disposed within housing 15 is a body 8 which, together with its associated parts, constitutes a separate sub-assembly whose action forms the principal basis of the present invention. As seen in Fig. 3, and as will be made clearer by the ensuing description, together with Figs. 4 and 5, the magnetic head 10 is rigidly held by a screw 44 onto a member 17 which in turn is slidably held such that arcuate shoulders 18 (see Fig. 5), on its upper and lower surfaces, bear against the corners of square shoulders 20 provided on the inside surfaces of the forked end of body 8.

Figure 5:
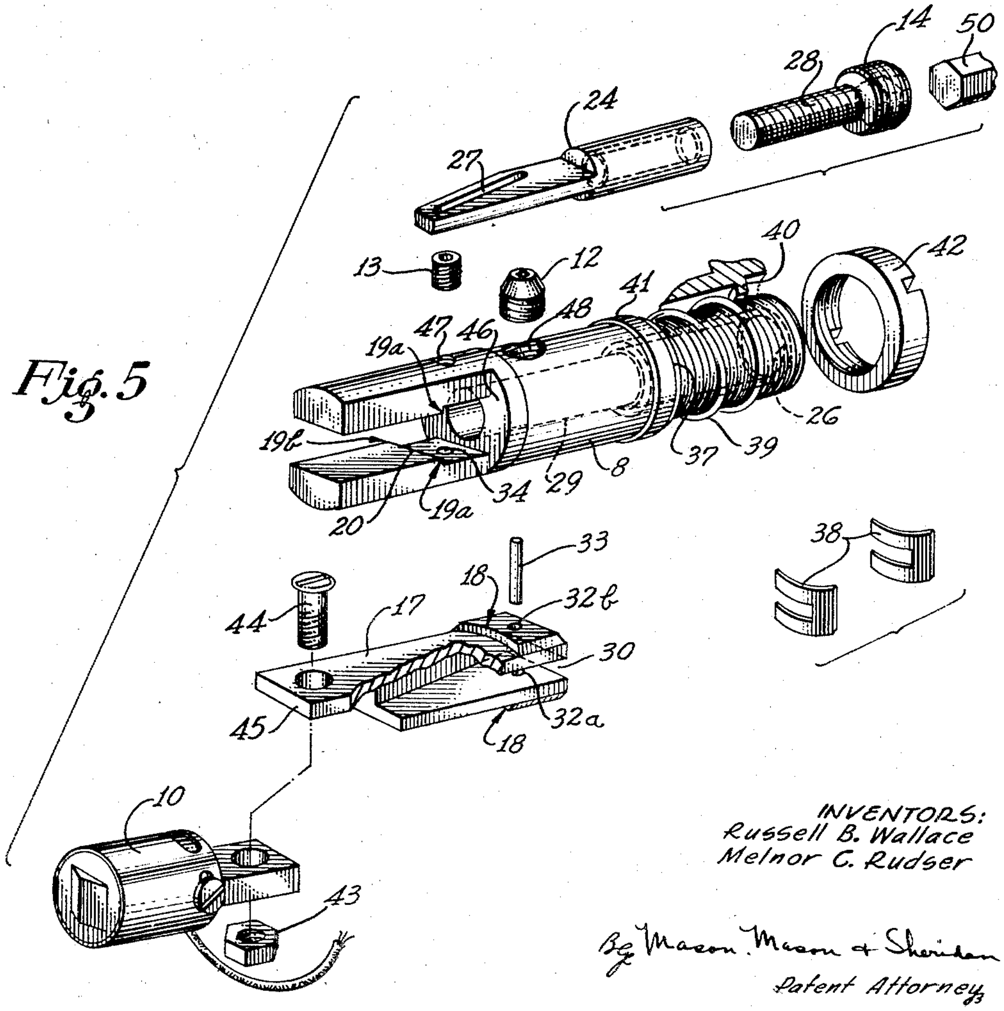
Fig. 5 is a disassembled view of the parts comprising the head mount assembly.

As noted particularly in Fig. 5, it should be understood that the chord of arcuate shoulder 18 is longer than the width of the square shoulder 20, and further that the curvature of arcuate shoulder 18 is intended to have the axis of drum 1 as its center.

Returning back to Fig. 3, the present invention thus provides for rotatably sliding the member 17 with respect to body 8 in the plane there shown such that the axis 21 of member 17, and hence the axis of magnetic head 10, is displaced angularly with respect to the fixed axis 22 of the body 8. This adjustment is obtained by manually rotating the threaded head 14 of a screw 28 within the internally threaded end 26 of body 8. For example, as a result of the head 14 of screw 28 being advanced into the body 8, a rod 24, threadably engaged therein, is moved axially through the hollow center portion 29 of body 8 (see Fig. 5). This axial movement causes a cross-pin 33 rigidly held in member 17 to be shifted laterally due to its confinement within the angular slot 27 in the end of rod 24. As is apparent, the amount of this lateral shift depends on the axial position of rod 24. During this action, a pair of leaf springs 38 urge the arcuate shoulders 18 of member 17 radially inward so that they at all times bear against the corners of the square shoulders 20 on the forked end of body 8. Thus, advancing screw head 14 into body 8 results in the axis 21 of the magnetic head 10, together with the longitudinal axis of member 17 to which it is attached, to assume an angle and to be displaced with respect to the axis 22 of the body 8 such that the magnetic head 10 is moved circumferentially counterclockwise about the drum 1, as illustrated in Fig. 6. On the other hand, when the threaded head 14 of screw 28 is advanced out of the body 8, the axis 21 of the magnetic head 10 is caused to assume the opposite angle and to be displaced on the opposite side of the axis 22 of the body 8, thus resulting in the head being moved circumferentially in a clockwise direction about the drum surface, as illustrated in Fig. 7.

Figure 4:
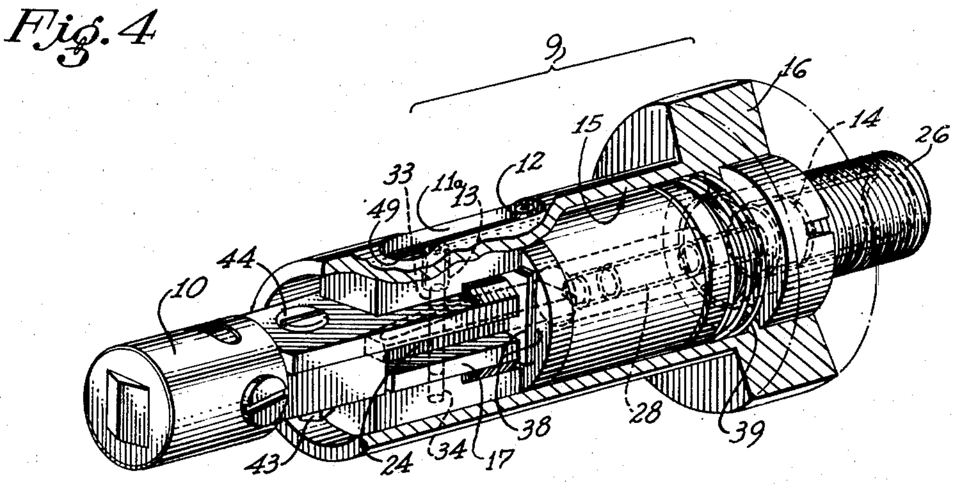
Fig. 4 is a perspective view of the head mount assembly with a portion of the housing cut away for showing the associated parts.

A detailed description of how the parts of the head mount assembly are arranged and constructed so as to accomplish the above-described actions will now be further revealed by reference to the perspective cut-away view of the head mount assembly in Fig. 4, together with the disassembled view of the parts shown in Fig. 5.

Prior to placing the head mount assembly 9 into sleeve 6, the body 8 and its associated parts are separately assembled by inserting the member 17 sidewise into the forked end of the body 8 such that the arcuate shoulders 18 on the upper and lower surfaces of member 17 bear on the corners 19*a* and 19*b* of the square shoulders 20 milled on the inner surfaces of the forked end of the body 8. The rod 24 has parallel flats milled on either side of one end in which an angular slot 27 is cut. The other end of rod 24 has an internal thread by which it can receive the right-hand threads on the body of adjusting screw 28. The rod 24 and screw 28 are then inserted into the end of body 8 provided with the internally threaded hole 26, and the head 14 of screw 28 is rotated such that the left-hand thread thereon causes the rod 24 to advance through the hollow center portion 29 of the body 8 until the milled flats on the rod 24 engage the slanted opening 30 provided in the side of member 17. When the angular slot 27 of the rod 24 is aligned with the holes 32*a* and 32*b* on the sides of the member 17, a cross-pin 33 is inserted through a clearance hole 34 on the lower side of the forked end of body 10 and pressed through the hole 32*a* on the lower side of the member 17. The cross-pin 33 then passes freely through the angular slot 27 on the rod 24 and is pressed through the hole 32*b* on the upper side of the member 17. The cross-pin 33 should be assembled such that its ends do not interfere with the inner surfaces of the forked end of body 8.

In order to cause the arcuate shoulders 18 of the member 17 to bear at all times against the square shoulders 20 on the forked end of body 8 so that point contact is made at corners 19*a* and 19*b* of the square shoulders 20, the open ends of the pair of curved leaf springs 38 are inserted between the base 46 of the fork in body 8 and the end of the member 17 such that they straddle the flats of the rod 24 extending out of the hollow center 29 of the body 8. A coil spring 39 is then placed so as to surround the externally threaded end of the body 8 and seat against the inside shoulder 37 thereof.

The subassembly thus obtained is then inserted into housing 15 by sliding the annular surface 41 on the cylindrical portion of body 8 within the internal wall of housing 15. With the threaded end of body 8 extending out of the flanged end of housing 15, the coil spring 39 is compressed between the internal flange 40 of the housing 15 and the inside shoulder 37 on the body 8. A nut 42 is then threaded onto the end of the body 8 so as to seat into a recess turned in the flange 16, thus positioning the body 8 radially within housing 15.

With the body 8 assembled in housing 15, a flat on the magnetic head 10 is next positioned on a lug 45 extending outwardly from the member 17 and secured there by a nut 43 and a screw 44. The head mount assembly 9 is now ready to be placed in the sleeve 6 of barrel 2.

The first adjustment required is the axial positioning of body 8 within the housing 15 so that the pole faces of magnetic head 10 have the desired radial clearance with respect to the surface of the drum 1. Prior to this adjustment, it is necessary to insert screw 12 into a tapped opening 48 on the top of the cylindrical portion of body 8. The diameter of set screw 12 is larger than the width of a slot 11*a* provided in the top of housing 15, hence set screw 12 is inserted into opening 48 by axially sliding the body 8 within housing 15 until the enlarged hole 49 at the end of the oval slot 11*a* is above the tapped opening 48 in the body 8. After the body of the set screw 12 has once been partially embedded in the body 8, it no longer interferes with the inner sides of oval slot 11*a*, and the body 8 can be moved axially within the housing 15. After the body 8 has been positioned radially so as to locate the pole faces of the magnetic head 10 approximately a thousandth of an inch away from the surface of drum 1, set screw 12 is rotated outwardly of opening 48 such that its conical top bears against the inside edge of slot 11*a*, thus locking the body 8 in position relative to the housing 15.

In order to next adjust the magnetic head 10 so that it will be displaced circumferentially from the radius 12*a* of the drum 1 which is in line with the axis 22 of the of the head assembly, to a slightly different radius of the drum 1, the socket head 14 of the adjusting screw 28 located within the internally threaded end of the body 8 need be merely rotated by means of hexagon head wrench 50, for example. As previously mentioned, the amount and direction of this adjustment is determined by noting on an oscilloscope the phase relation of a reference signal sensed by the read transducer with a signal from the clock recording.

As the head 14 of screw 28, having a left-hand thread turned thereon, is rotated counterclockwise, the head 14 advances radially inwardly into the body 8; and the rod 24 is also caused to be advanced radially inwardly because of the right-hand threads on the mating ends of the rod 24 and the body of screw 28. Consequently the angular slot 27 creates a sidewise thrust upon the cross-pin 33 which results in moving the longitudinal axis of the member 17 and, therefore, the axis of magnetic head 10 to the right of the stationary axis 22 of the mount assembly. The action of the pair of leaf springs 38, operating simultaneously to this sidewise motion, holds the arcuate shoulders 18 on the surfaces of members 17 in contact with the shoulders 20 on the forked end of body 8. That is, the arcuate shoulders 18 of member 17 maintain their two point contact on the corners 19*a* and 19*b* of the square shoulders 20 of body 8. It is thus seen that as a result of rotating the head 14 of screw 28 counterclockwise the member 17 is caused to slide so that its axis 21 is displaced with respect to the axis 22 of the housing 15, and further such that its axis 21 has an angular relation with respect to the housing axis 22, as shown schematically in Fig. 6. It should be understood that the lateral motion imparted to the member 17 by the rotation of screw 18 to its full travel in either direction should not be so great that the arcuate shoulders 18 no longer bear on both corners 19*a* and 19*b* of square shoulders 20.

As the head 14 of the adjusting screw 28 is rotated clockwise out of the body 8, the body of screw 28 threadably engages the rod 24 so as to advance the slotted flat portion of rod 24 radially outward. The sides of angular slot 27 now create a sidewise thrust on the cross-pin 33 of the member 17 so as to displace its axis 21 in the opposite direction; that is, to the left of the stationary axis 22 of the mount assembly. This displacement, together with the action of the pair of leaf springs 38, causes the axis 21 of the member 17 to tilt with respect to the stationary axis 22 of the mount assembly. As a result, the magnetic head 10 now is moved circumferentially in the opposite direction about the surface of the drum 1, as shown in Fig. 7.

As apparent, only a small range of circumferential adjustment of the magnetic head is provided by the present embodiment of the invention, but this is adequate enough to move the magnetic heads so as to vary the delay period of the recirculating loop, determined by the clock recording, by as much as two or three clock pulse periods.

After the magnetic head 10 has been manually adjusted to its desired circumferential position, the magnetic head 10 is locked in this position by means of set screw 13 which is accessible by means of the oval slot 11*a* in the top of housing 15. This set screw 13 is threaded into a tapped opening 47 in the body 8 such that its end abuts against the flat surface of the member 17, thus holding the body 8 and member 17 from moving relative to each other.

While the device as shown and described herein is admirably adapted to fulfill the objects and features of advantage previously enumerated as desirable, it is to be understood that the invention is not to be limited to these specific features, but that the means and construction herein disclosed are susceptible of modification in form, proportion, and arrangement of parts without departing from the principle involved or sacrificing any of its advantages; and the invention is therefore claimed in embodiments of various forms, all coming within the scope of the claims which follow.

What is claimed is:

1. Apparatus for adjusting the position of a magnetic head about the circumference of a drum comprising a stationary mount having a longitudinal axis which is substantially aligned along a radius of said drum, a magnetic head assembly adjustably attached to said mount such that its longitudinal axis is initially aligned with the axis of said mount, and rotatable means adapted to adjust said magnetic head assembly relative to said mount so as to align the axis of said assembly with a radius of said drum removed from but closely adjacent to the axis said mount.

2. Apparatus for adjusting the position of a transducer about the surface of a drum comprising a stationary mount having a longitudinal axis which is substantially aligned along a radius of said drum, a transducer assembly adjustably attached to said mount such that its longitudinal axis is initially aligned with the axis of said mount, means for adjusting said transducer assembly relative to said mount so as to align the axis of said assembly with a radius of said drum removed from but closely adjacent to the axis of said mount, and means for maintaining the clearance of said transducer with respect to the surface of said drum while effecting said adjustment.

3. Apparatus for adjusting the position of a magnetic head about the circumference of a drum comprising a stationary means having a bearing surface substantially normal to a radius of said drum, a magnetic head holder having an arcuate surface at an intermediate point thereof whose curvature is defined by the axis of said drum, means yieldingly urging the arcuate surface of said holder against the bearing surface of said stationary means, and means having a radial travel for imparting a lateral motion to said holder, whereby said holder is caused to move relative to said stationary means on a path defined by its arcuate surface.

4. An adjustable means for positioning a transducer about the periphery of a magnetic drum comprising a cylindrical mount whose axis is substantially aligned along a radius of said drum, said mount having a square shoulder, a transducer assembly having an arcuate shoulder bearing against said square shoulder on said mount, means yieldingly urging the shoulders of said transducer assembly and mount together, and means having a radial motion for effecting relative movement of said transducer assembly and mount.

5. Apparatus of the class described comprising a cylindrical stationary member, a holder adjustable along the longitudinal axis of said member and having an abutment on one end thereof normal to said axis, a head assembly having a surface slidable on said abutment, means yieldingly urging the surface of said head assembly to bear against said abutment, a cross-pin held in said head assembly, means confined to move along the axis of said member and having an angular slot on one end engaging said cross-pin, and a screw threadably engaged for actuating said latter means, whereby rotating said screw causes said head assembly to slide on said abutment along a path defined by its surface.

6. A mount for adjusting the position of a magnetic head about the circumference of a drum comprising a stationary means having a bearing surface substantially normal to a radius of said drum, a magnetic head holder having an arcuate surface whose curvature is defined by the axis of said drum, means yieldingly urging the arcuate surface of said holder inwardly against the bearing surface of said stationary means, a cross-pin fixed in said magnetic head holder at a point radially outward from the arcuate surface, and an adjustable member having a slot positioned at an angle with respect to its radial travel for engaging said cross-pin, whereby moving said member causes said magnetic head holder to be adjusted circumferentially about said drum relative to said stationary means dependent on the radial position of said member.

7. Apparatus for adjusting the position of a sensing device about the periphery of a drum comprising a holder for said device having an abutment on the lateral surface thereof whose shape conforms with said periphery, a stationary cylindrical housing whose axis is aligned with a radius of said drum, a body concentrically disposed within said housing and having a square shoulder on a lateral surface thereof whose width is less than the width of said abutment, means yieldingly urging the abutment on said holder to bear on the corners of the square shoulder of said body, a first control means for positioning said body within said housing so as to provide radial clearance between said sensing device and the periphery of said drum, and a second control means having a radial travel for effecting lateral movement of said holder with respect to said body, thereby causing said sensing device to be moved circumferentially about the periphery of said drum while maintaining said radial clearance.

8. An adjusting mount for a magnetic head positioned to cooperate with the surface of a rotating drum comprising a cylindrical stationary housing, a body confined to move along the axis of said housing and having an internally threaded portion on the outer end thereof, means for fastening said body within said housing, an elongated adjusting member disposed concentrically within said body and having an internally threaded portion on the outer end thereof whose threads are opposite to that of said body, an adjusting screw having opposite ends thereof in threaded engagement with the internally threaded portions of said body and said member, a magnetic head holder having an arcuate shoulder thereon bearing against an abutment provided on the inner end of said body, and means actuated by rotating said screw for effecting lateral movement of said holder with respect to said body.

9. Apparatus of the class described comprising a cylindrical stationary member provided with shoulders on the opposite inside surfaces of the forked end thereof, a magnetic head holder positioned within the forked end of said member such that arcuate surfaces on its sides abut the corners of said shoulders, spring means positioned for yieldingly urging the arcuate surfaces of said head holder against the corners of said shoulders, a rod having a sliding fit along the axis of said member and having an angular slot on one end thereof insertable in an opening of said head holder, a cross-pin fixed in said head holder and positioned to freely pass through said angular slot, a socket head screw having threads on its head for engaging internal threads in said member and having reverse threads on its body threadably engaging a tapped hole in said rod, whereby as said socket head screw is rotated said head holder moves about a path defined by its arcuate surfaces.

10. Apparatus for precisely positioning a transducer about the periphery of a rotatable member comprising: a stationary mount having an axis which is substantially aligned along a radius of said rotatable member; a holder for a transducer attached to said mount such that the axis of said holder is normally aligned with the axis of said mount; means accessible from the outer end of said mount for effectively adjusting said holder relative to said mount so as to align the axis of said holder with a radius of said rotatable member removed from but closely adjacent to the axis of said mount; and means for substantially maintaining the clearance of said transducer with respect to the surface of said rotatable member while effecting said adjustment.

11. A mounting for a magnetic head comprising: a cylindrical member; a cylindrical body adjustable along the longitudinal axis of said member and having an abutment on one end thereof substantially normal to said axis; means for fastening said body to said member; a magnetic head holder having an offset surface; means for holding the offset surface of said holder in sliding contact with the abutment on said body; and rotatable means engaging said head holder and capable of being actuated from the outer end of said member to effect the displacement of the axis of said head holder with respect to the axis of said cylindrical member.

12. A magnetic head mounting structure comprising: a cylindrical supporting member having a forked end, said forked end provided with shoulders on the opposite inside surfaces thereof; a magnetic head holder positioned within the forked end of said member such that offset surfaces on its sides bear on said shoulders; means for holding the offset surfaces on said head holder in sliding contact with the shoulder of said member; and rotatable means engaging said head holder and capable of being actuated from the outer end of said member to laterally displace said head holder relative to said member.

References Cited in the file of this patent

UNITED STATES PATENTS

| | | |
|---|---|---|
| 2,644,856 | Pettus | July 7, 1953 |
| 2,668,879 | D'Arcy | Feb. 9, 1954 |
| 2,680,785 | Franklin | June 8, 1954 |
| 2,708,693 | Hendrickson | May 17, 1955 |
| 2,721,743 | Erikson | Nov. 25, 1955 |